United States Patent Office 3,836,626
Patented Sept. 17, 1974

3,836,626
CANINE DISTEMPER VIRUS VACCINE
John F. Lavender, Indianapolis, Ind., assignor to Eli
Lilly and Company, Indianapolis, Ind.
No Drawing. Filed Jan. 29, 1973, Ser. No. 327,552
Int. Cl. C12k 9/00, 5/00
U.S. Cl. 424—89                                    11 Claims

ABSTRACT OF THE DISCLOSURE

A canine distemper virus vaccine is produced by growth of an attenuated canine distemper virus in

LLC—MK$_2$ monkey kidney cell line culture.

BACKGROUND OF THE INVENTION

Canine distemper has long been known as a serious endemic disease of domestic dogs which also affects other animals. The mustelidae, such as mink, ermine, and badger, as well as wild canines such as fox and wolf, are affected by canine distemper. Vaccines against canine distemper have been in use for many years.

The production of virus vaccines begins with the growth of the virus on an appropriate host. The most usual host for production of canine distemper virus vaccine, as well as for many other virus vaccines, has been eggs. Virus vaccines have also been produced in cell culture. A cell culture is a culture living animal cells. The usual cell culture takes the form of a monolayer of cells growing, in a suitable growth medium, on the wall of a culture bottle. Cell cultures may in some instances be successfully grown as suspensions of individual cells in the growth medium.

The common cultured cells are primary cells, which are cells grown directly from a sample of an animal organ, for example, a canine kidney.

Recently, it has been found that viruses can be more advantageously grown to produce vaccines in cultures of cells from continuous cell lines. A continuous cell line is a strain of cells, originating in a primary cell culture, which will replicate through successive serial passages.

Growth of viruses in cells of continuous cell lines has advantages over growth in eggs or in primary cells. Cell-line-grown vaccines are comparatively free of adventitious microorganisms and of contaminating host cell debris.

Many researchers have worked to devise methods for the growth of viruses in cells of continuous cell lines. For example, the virulent Onderstepoort strain of canine distemper virus has been grown in LLC—MK$_2$ Rhesus monkey kidney cells to produce reasonably satisfactory yields, but with cytopathogenic effect on the host cells. Bussel et al., Canine Distemper Virus in Primary and Continuous Cell Lines of Human and Monkey Origin, *Arch. ges. Virusforsch.* 17, 183–202 (1965). The Lederle strain of canine distemper virus is known to replicate in both LLC—MK$_2$ and in Vero green monkey cell lines, with cytopathogenic effect. Shishido et al., Development of a Cell Culture System Susceptible to Measles, Canine Distemper, and Rinderpest Viruses, *Arch. ges. Virusforsch.* 22, 364–380 (1967).

The LLC—MK$_2$ cell line, which is on unrestricted deposit as CCL 7 (a close derivative is known as CCL 7.1) at the American Type Culture Collection, 12301 Parklawn Drive, Rockville, Md. 20852, is a desirable cell line for vaccine production. LLC—MK$_2$ can be grown over a very wide range of serial passages with virtually no change, deterioration, or mutation of the cells. The cell line is approved by the appropriate regulatory agencies for the production of veterinary vaccines over a wide range of passages. Further, each culture of the cells can be divided among as many as ten new cultures of the same size as the original. Thus, a ten-fold increase in the number of cells available can be obtained at each successive passage, whereas the cells of many continuous cell lines can be multiplied only two- or three-fold at each successive passage.

SUMMARY

I have invented and disclose a canine distemper virus vaccine which comprises an attenuated antigenic canine distemper virus which is adapted to growth in the

LLC—MK$_2$ cell line, and which does not produce cytopathogenic effect upon growth in any known mammalian cell line. I have also invented a method of producing my vaccine by growth of the attenuated antigenic canine distemper virus in cultures of the LLC—MK$_2$ cell line, and a method of immunizing dogs against canine distemper by administering my vaccine to the dogs.

DESCRIPTION OF THE PREFERRED EMBODIMENT

The new canine distemper virus vaccine which I have discovered comprises a diluent liquid and an antigenic canine distemper virus which (a) immunizes a dog, which does not have and is not immune to canine distemper at the time of immunization, against canine distemper when a dose of at least about $10^2$ EID$_{50}$ of the virus is administered percutaneously to the dog;
(b) does not cause signs of canine distemper in a dog to which the virus is administered;
(c) replicates in LLC—MK$_2$ monkey kidney cell line culture to produce a virus concentration of from about $10^3$ to about $10^5$ EID$_{50}$/ml. in from about 3 to about 4 days after inoculation of at least about $10^2$ EID$_{50}$ of the virus into the LLC—MK$_2$ monkey kidney cell line;
(d) does not produce cytopathogenic effect upon cells of mammalian continuous cell lines in cell culture; and
(e) produces opaque plaques on the chorioallantoic membrane of an incubated fertile chicken egg within 7 days after the introduction of the virus into the egg in a concentration not less than about $10^{-5}$ of the maximum concentration of the canine distemper virus culture medium.

My new method of producing a canine distemper vaccine comprises the steps of (1) culturing LLC—MK$_2$ monkey kidney cells in a suitable growth medium containing from about 2 percent to about 5 percent of mammalian blood serum;
(2) inoculating the LLC—MK$_2$ cells with the antigenic canine distemper virus described above;
(3) allowing the virus to grow at a temperature from about 33° to about 40° C. until the titer of the growth medium, which is now the vaccine, is from about $10^3$ to about $10^5$ EID$_{50}$ per ml.; and
(4) harvesting the vaccine.

The improved antigenic canine distemper virus described above has been deposited in the American Type Culture Collection, 12301 Parklawn Drive, Rockville, Md. 20852, under the deposit number VR 685. The deposit will be made nonrestricted, so that all may obtain my novel canine distemper virus, when a United States patent is issued on the present United States patent application or a successor application thereof. The new adapted canine distemper virus, which makes my new vaccine, vaccine production method, and immunization method possible, will be described thoroughly.

The virus is a modification of the well-known Snyder-Hill virulent canine distemper strain, which is maintained on deposit at Cornell University College of Agriculture, Ithaca, N.Y. Attenuation by means of 100 serial passages in primary dog kidney cells was the first step of the modification. The next step of the modification consisted of seven serial passages in 7-day incubated fertile hen's eggs, which passages adapted the virus to growth in eggs so that it can be assayed by an egg-infective dose determination. The assay method will be described below.

The virus was then passed through four additional primary dog kidney cell passages. At that point in the modification, the virus was adequately attenuated and produced an immunizing canine distemper virus vaccine. It was desired, however, to produce the vaccine in a continuous cell line heterologous to the dog. The most appropriate cell for production was determined to be the LLC—$MK_2$ Rhesus monkey kidney cell line.

I adapted the attenuated virus to LLC—$MK_2$ by two serial passages of the virus in a African green monkey kidney cell line. When the virus had reached maximum concentration in the second green monkey passage, it was transferred into an LLC—$MK_2$ culture by adding virus-containing growth medium to a suspension of the LLC—$MK_2$ cells.

The virus grew to vaccine-producing concentrations, about $10^4$ $EID_{50}$/ml., with the first passage in LLC—$MK_2$ cells after the adaptation process in African green monkey cell line culture. Serial passages in the LLC—$MK_2$ cell line were continued, and my perfected deposited virus, ATCC VR 685, represents my improved antigenic canine distemper virus at the 8th LLC—$MK_2$ passage. It will be clear to those skilled in virology that equivalent results are obtained by growing the attenuated virus at a range of passage levels. The distemper virus, while deposited at the 8th LLC—$MK_2$ passage, is useful for production of vaccine at passage levels from about the second to about the 20th LLC—$MK_2$ passage.

The canine distemper virus, after its attenuating and adapting steps, is distinguished from other distemper viruses by a unique combination of characteristics.

First, the virus is capable of immunizing a dog, which does not have and is not immune to canine distemper when vaccinated with a dose of at least about $10^2$ $EID_{50}$ of the virus. Subcutaneous injection is preferred although intramuscular injection is also satisfactory. The usual, conservative immunizing dose of the virus is about 2 ml. of a vaccine containing from about $10^3$ to about $10^5$ $EID_{50}$/ml. However, since the vaccine contains the live attenuated virus, it is necessary only to give a large enough number, such as $10^2$ $EID_{50}$, of virus particles that the virus will surely replicate in the vaccinated dog. Normal replication of the virus within the dog then provides enough particles to confer solid immunity.

Second, the virus is attenuated to the degree that administration of the virus to a nonimmune dog does not produce signs of canine distemper.

Third, the virus replicates in LLC—$MK_2$ cell culture at such a high rate of growth that it produces a concentration of from about $10^3$ to about $10^5$ $EID_{50}$/ml. in from about 3 to about 4 days after inoculation of the virus into the cell culture. Each culture may be inoculated with as little as $10^2$ $EID_{50}$ of the virus. The rate of growth is adequate to produce my canine distemper vaccine economically. It is to be understood that the named high rate of growth and high concentration are obtained when optimum methods of production, as taught in this specification, are used.

Fourth, the virus does not produce cytopathogenic effect in cells of any known mammalian continuous cell line. Cytopathogenic effect is a useful indication that the virus has infected the cells, but the absence of cytopathogenic effect is an advantage in that the host cells remain in good condition despite the growth of the virus. Therefore, it is possible to obtain repeated harvests of vaccine from a single LLC—$MK_2$ cell culture. It is routine to obtain three harvests of my vaccine from each culture. As many as six harvests have been obtained.

Fifth, the virus produces opaque plaques within 7 days on the chorioallantoic membrane of the incubated fertile chicken egg when introduced into the egg in a concentration not less than about $10^{-5}$ of the maximum concentration of the canine distemper virus culture medium. The opaque plaques are used to measure the titer of suspensions of the virus in the following convenient analytical method. Serial dilutions of a suspension of the virus are made down to about $10^{-6}$ of the original concentration. A number of 7-day incubated hen's eggs are sterilized on the outside and the shells are punctured. One-tenth milliliter of a serial dilution of the virus-containing suspension is inoculated on the chorioallantoic membrane of each egg, and the eggs are incubated for 7 days more.

The chorioallantoic membranes are examined. Eggs which show 3 or more opaque white plaques on the membrane are taken to be positive. The dilution which produces 50 percent positives is defined as containing one $EID_{50}$ per 0.1 milliliter. The virus concentration of the virus suspension, in $EID_{50}$/ml., is calculated from that dilution.

The novel canine distemper virus vaccine which I disclose for the first time is produced by the growth of the virus in LLC-$MK_2$ cell culture. The novel vaccine comprises the virus suspended in an appropriate diluent liquid. The usual diluent liquid is simply the growth medium in which the virus is grown, to which an appropriate bulking agent is preferably added. In order to improve the storage stability of my vaccine, it is usually lyophilized and stored in the dried form. The dried vaccine is reconstituted with sterile water before use. The nonvolatile components of the growth medium remain in the dried vaccine when the liquid vaccine is lyophilized, and redissolve when the dried vaccine is reconstituted. Thus, the composition of the diluent liquid of the reconstituted vaccine is the same as the original growth medium.

It is possible to concentrate viruses from growth media by chromatography, centrifugation, dialysis, and other sophisticated processes. Such a purification step could be applied to my vaccine. The purified virus would then be redispersed in a new diluent liquid. Since the growth medium is a satisfactory diluent liquid in my vaccine, no expensive virus purification step is necessary.

A bulking agent is normally added to a liquid injectable vaccine before lyophilization. The bulking agent is useful as an aid in drying and in reconstituting the dried vaccine to a liquid for administration. A number of bulking agents suitable for use in my vaccine are in wide use and are very well known to the vaccine art. The requirements of a satisfactory bulking agent are high water solubility, the ability to form hydrophilic films around the individual particles of the dried vaccine, and complete physiological acceptability. Suitable injectable vaccine bulking agents include sucrose, protein digests, gelatin, lactose, and mixtures of gelatin and lactose. The preferred bulking agent for use in my vaccine is a pancreatic digest of casein known as N-Z-Amine AS, a trademarked product of Sheffield Chemical Company, Union, N.J.

My canine distemper virus vaccine is produced by the practice of my novel production method. The following general description of my method will be given to assist those skilled in the microbiological production art in obtaining my vaccine. A specific example of vaccine production will also be given.

Production of my vaccine by growth in cell culture bottles is described below. It is to be understood that it can also be produced by other cell culture processes. For example, roller tube cultures and suspension cultures may be used by making adjustments in the production method. Those skilled in the art will be aware of the necessary adjustments. Production in culture bottles is the preferred embodiment of my production method.

It is to be understood that all of the steps in vaccine production must be carried out under rigorously sterile conditions. No specific instructions to that effect will be given or will be needed by those skilled in the art.

Appropriate growth media for use in my method of vaccine production may be any of the normally-used cell culture media. LLC–MK$_2$ cells will grow in a large number of media, and the virus will grow in the cells without criticality in the choice of medium. It has been found that medium 199 is the preferred growth medium. The formula of medium 199 is set out immediately below. A number of other growth media, which are also typical of culture media for growth of mammalian cells, and which are appropriate for the production of my vaccine, are also described. The concentrations of the ingredients are in milligrams per liter.

Medium 199

L-alanine, 25; L-arginine·HCl, 70; L-aspartic acid, 30; L-cysteine·HCl, 0.1; L-cystine, 20; L-glutamic acid, 75; L-glutamine, 100; glutathione, 0.05; glycine, 50; L-histidine·HCl, 20; L-hydroxy proline, 10; L-isoleucine, 20; L-leucine, 60; L-lysine·HCl, 70; L-methionine, 15; L-phenylalanine, 25; L-proline, 40; L-serine, 25; L-threonine, 30; L-tryptophan, 10; L-tyrosine, 40; L-valine, 25; ascorbic acid, 0.05; biotin, 0.01; calciferol, 0.1; D-calcium pantothenate, 0.01; choline chloride, 0.5; folic acid, 0.01; $i$-inositol, 0.05; menadione, 0.01; niacin, 0.025; nicotinamide, 0.025; $p$-aminobenzoic acid, 0.05; pyridoxal·HCl, 0.025; pyridoxine·HCl, 0.025; riboflavin, 0.01; DL-$\alpha$-tocopherol phosphate, 0.01; thiamin·HCl, 0.01; Vitamin A, 0.1; sodium acetate, 50; D-ribose, 0.5; 2-deoxy-D-ribose, 0.5; adenylic acid (muscle), 0.2; adenine, 10; guanine·HCl, 0.3; hypoxanthine, 0.3; thymine, 0.3; uracil, 0.3; xanthine, 0.3; adenosine triphosphate, 10; cholesterol, 0.2; Tween 80, 5; Fe(NO$_3$)$_3$·9H$_2$O, 0.1; CaCl$_2$, 200; dextrose, 1000; KCl, 400; MgSO$_4$, 100; NaCl, 6800; NaH$_2$PO$_4$·H$_2$O, 140; NaHCO$_3$, 2200; phenol red, 17.

F–10 (Ham's)

L-alanine·HCl, 8.91; L-arginine·HCl, 211; L-asparagine·H$_2$O, 15; L-aspartic acid, 13.3; L-cysteine·HCl, 31.5; L-glutamic acid, 14.7; L-glutamine, 146.2; glycine, 7.51; L-histidine·HCl, 21; L-isoleucine, 2.6; L-leucine, 13.1; L-lysine·HCl, 29.3; L-methionine, 4.48; L-phenylalanine, 4.96; L-proline, 11.5; L-serine, 10.5; L-threonine, 3.57; L-tryptophan, 0.6; L-tyrosine, 1.81; L-valine, 3.5; biotin, 0.024; D-calcium pantothenate, 0.715; choline chloride, 0.698; folic acid, 1.32; $i$-inositol, 0.541; nicotinamide, 0.615; pyridoxine·HCl, 0.206; riboflavin, 0.376; thiamin·HCl, 1.012; Vitamin B$_{12}$, 1.36; CaCl$_2$·2H$_2$O, 44.1; CuSO$_4$, 0.0025; dextrose, 1100; FeSO$_4$, 0.834; hypoxanthine, 4.08; lipoic acid, 0.2; MgSO$_4$·7H$_2$O, 152.8; KCl, 285; KH$_2$PO$_4$, 83; NaHCO$_3$, 1200; NaCl, 7400; Na$_2$HPO$_4$, 153.57; sodium pyruvate, 110; thymidine, 0.727; ZnSO$_4$, 0.028; phenol red, 17.

Minimum Essential Medium (MEM)

L-arginine·HCl, 126.9; L-cystine, 24.0; L-histidine·HCl, 38.3; L-isoleucine, 52.4; L-leucine, 52.4; L-lysine, 73.1; L-methionine, 15.0; L-phenylalanine, 33.0; L-threonine, 47.6; L-tryptophan, 10.2; L-tyrosine, 36.2; L-valine, 46.8; D-calcium pantothenate, 1.0; choline chloride, 1.0; $i$-inositol, 2.0; folic acid, 1.0; nicotinamide, 1.0; pyridoxal·HCl, 1.0; riboflavin, 0.1; thiamin·HCl, 1.0; CaCl$_2$, 200; dextrose, 1000; KCl, 400; MgSO$_4$, 100; NaCl, 6800; NaHCO$_3$, 2000, NaH$_2$PO$_4$·H$_2$O, 140; phenol red, 17; L-glutamine, 292.2.

Basal Medium Eagle

L-arginine·HCl, 21.1; L-cystine, 12.0; L-histidine, 9.6; L-isoleucine, 26.1; L-leucine, 26.2; L-lysine·HCl, 36.5; L-methionine, 7.5; L-phenylalanine, 16.5; L-threonine, 23.8; L-tryptophan, 4.1; L-tyrosine, 81.1; L-valine, 23.4; D-calcium pantothenate, 1.0; choline chloride, 1.0; $i$-inositol, 2.0; biotin, 1.0; folic acid, 1.0; nicotinamide, 1.0; pyridoxal·HCl, 1.0; riboflavin, 0.1; thiamin·HCl, 1.0; CaCl$_2$, 200; dextrose, 1000; KCl, 400; MgSO$_4$, 100; NaCl, 6800; NaHCO$_3$, 1680; NaH$_2$PO$_4$·H$_2$O, 140; phenol red, 17; L-glutamine, 292.2.

It is advisable and usual to add small amounts of antibiotic compounds to the growth media used in the production of virus vaccines. Neomycin sulfate, penicillin, mycostatin, and streptomycin are frequently used in such growth media to kill or at least inhibit adventitious organisms, especially bacteria and fungi, which may accidentally be introduced into the culture. Any or all of the usual antibiotics may be helpfully used in my method of vaccine production. The preferred antibiotics for use in my method are penicillin and streptomycin.

A mammalian blood serum is added to the growth medium. Addition of sera to growth media for vaccine production is a feature of many vaccine protocols. Many different sera, such as those obtained from horses, cattle, swine, dogs, and cats, are regularly used as additives to vaccine production growth media. The preferred serum in the production of my vaccine is fetal calf serum. It is to be understood, however, that other mammalian blood sera are also useful in my vaccine production method, although there are differences in the extent of the benefits obtainable by the use of different sera.

The preferred level of blood serum in the growth medium is about 3 percent. The range of serum levels is from about 2 percent to about 5 percent. It will be understood, however, that the level of serum is determined by a balancing of growth efficiency against the cost of the serum. In some instances, then, the balance will indicate the use of a serum level outside the stated range.

Both the virus and the LLC—MK$_2$ cells in which the virus is grown may be obtained from the ATCC as frozen seed. The first step in the production of my vaccine is to grow a culture of LLC—MK$_2$ cells. A vial of frozen cells is thawed, washed to remove the freezer medium, and planted in a suitable growth medium in a culture bottle.

When the cells have grown and formed a confluent cell sheet, the growth medium is poured out of the bottle, the cell sheet is dispersed with trypsin or a salt of ethylenediaminetetraacetic acid, and the cells are divided among several new bottles. Growth of cells is continued until a number of cultures adequate for the planned production is available.

The virus is then inoculated in the cell cultures. The lyophilized virus seed is reconstituted with sterile water, and planted as a suspension in the suspended trypsinized cells. The cell-virus suspension is stirred for about ½ hour at 4° C. before it is put into cell culture bottles. The virus may also be inoculated into the tissue culture by adding suspensions of the virus seed to cells in the bottles, or even to cells which have formed a cell sheet. Most efficient inoculation of the virus into the cells is achieved, however, when inoculation is performed in the stirred cell-virus suspension.

The virus is then allowed to grow for about 3 or 4 days until maximum concentration of from about 10$^3$ to about 10$^5$ EID$_{50}$/ml. is achieved. Growth temperatures are those routine in cell culture virus production, from about 33° to about 40° C. The preferred growth temperature for production of my vaccines is about 36–37° C. Those skilled in the microbiological production art are aware that viruses may be grown over a range of temperatures, with varying efficiency of vaccine production. The temperatures, as well as the other conditions, named here are those at which the virus produces vaccine most effectively, and are not intended to specify the outer limits of operability of my method.

The vaccine is harvested by merely pouring the growth medium, which is now the vaccine, off the cell sheet. Since the cell sheet is not injured by the virus, another portion of growth medium may be added and another harvest obtained in about 3 or 4 days more.

Finishing steps, while necessary to the preparation of a salable vaccine, are not part of my novel process, which is complete with the harvest of the vaccine from the cells. The finishing steps will be briefly described for the sake of completeness.

The harvested vaccine is adjusted to a pH of about 7.2 to 7.4 with NaOH or HCl. After appropriate assay and sterility tests, a bulking agent is added to the vaccine, it is dispensed into vials, and is lyophilized to a moisture content less than 5 percent. The vials are then sealed, usually with rubber stoppers and metal retainers.

The following example of production of a vaccine by a representative production method is given in order to assure that the process is completely understood.

Example 1

The growth medium used in all of the steps of the vaccine production process of this example was medium 199 with 3 percent of fetal calf serum, 100 units of penicillin/ml., and 100 mcg. of streptomycin/ml. added.

A 1 ml. ampoule of LLC—MK$_2$ cells was thawed and opened. The contents were removed and washed twice with about 10 ml. amounts of growth medium, centrifuging the cells down after each washing. The washed cells were transferred to a cell culture bottle containing about 50 ml. of growth medium. The bottle was closed and stored at 37° C., and the medium was changed every 4 days until the cell sheet was confluent.

The medium was then poured off the cell sheet and the cell sheet was trypsinized with about 5 ml. of 1 percent trypsin solution. The trypsin was poured off within 1 minute, and 25 ml. of growth medium was added. The bottle was stoppered and shaken vigorously to disperse all clumped cells. The cell suspension was then divided between two 64-oz. culture bottles, each containing about 200 ml. of growth medium. The cultures were grown at about 37° C., with medium changes each 4 days, until their cell sheets were confluent.

The medium was poured from each bottle and the cell sheets were trypsinized with 1 percent trypsin. The cell aggregates were broken up and suspended by shaking in 25 ml. of growth medium.

The cells were then centrifuged for 10 minutes and the supernatant discarded. The packed cells were resuspended in 50 ml. of growth medium in a stirrer flask. To the stirrer flask was added 5 ml. of freshly-reconstituted canine distemper virus seed, obtained from the American Type Culture Collection as ATCC VR 685. The virus seed contained about $10^4$ $EID_{50}$/ml.

The suspension of cells and virus was stirred at 4° C. for 30 minutes. Ten 64-oz. bottles were prepared, each containing 200 ml. of growth medium, and 5 ml. of the cell-virus suspension was added to each bottle. The bottles were closed and held at 36° C. for 4 days. The cell layers were then confluent and the growth medium had a titer of $10^{4.5}$ $EID_{50}$/ml. The growth medium, which had become the vaccine, was poured off the cell sheets, and the bottles were refilled with 200 ml. each of fresh growth medium. The growth-harvest cycle was repeated twice, giving a total harvest of 600 ml. of vaccine per bottle or 6 liters of vaccine from 10 bottles.

The pH of the vaccine was adjusted to 7.4 with NaOH, and 180 g. of N-Z-Amine AS was added and dissolved in the 6 liters of vaccine. Samples were taken for sterility testing and assay. The vaccine was then dispensed in 2 ml. doses into vials, closed with grooved stoppers, and lyophilized to a moisture content of 3 percent, and the vials were sealed. Samples for sterility testing and assay were taken after lyophilization as well.

The titer of the lyophilized vaccine, determined on a sample vial which had been reconstituted with pyrogen-free water to its original volume, was $10^{3.9}$ $EID_{50}$/ml.

The vaccine prepared above is useful for vaccinating dogs and other animals to immunize them against canine distemper. The dog is the most important animal subject to the disease, but such fur-producing animals as fox, ferret, raccoon, ermine and mink also suffer from it. Such animals, when reared in captivity, may be immunized with my vaccine.

The vaccine is best used in my method of immunizing dogs against canine distemper, which comprises the percutaneous administration of an immunizing amount of the vaccine to each dog. As described above, an amount of vaccine which supplies at least $10^2$ $EID_{50}$ of virus to each dog is immunizing. It is preferred to use a larger amount of vaccine which supplies from about $10^3$ to about $10^6$ $EID_{50}$ of virus to each dog.

The safety and antigenicity of my vaccine has been proven. One such test is reported in the following example.

Example 2

Eight- to 12-week-old puppies were screened for serum neutralizing antibody to canine distemper virus. Twelve dogs free of antibody were used in the test.

The first and second harvests of each of two lots of canine distemper virus vaccine, prepared as in Example 1, were used in the test. Two dogs were vaccinated by subcutaneous injection with each of the four samples of vaccine. The vaccine was prepared for use in the test by reconstitution to original volume with pyrogen-free sterile water. The reconstituted vaccine was then held for 3 days at 36° C., as a check of the vaccine's shelf storage stability.

The eight dogs which were vaccinated with the four samples of canine distemper vaccine received 0.2 ml. each, 1/10 of a normal dog dose, of the vaccine. Four unvaccinated dogs were held as controls.

After about 2 weeks, a blood sample was taken from each dog and serum neutralizing (SN) antibody was determined. The determination was made by making serial dilutions of each dog's blood serum. An equal volume of a suspension of virulent Snyder-Hill canine distemper virus containing 100 to 500 $EID_{50}$ was added to each dilution tube. The serum-virus mixtures were incubated for 2 hours at 4° C. After the incubation, fertile 7-day incubated chicken eggs were inoculated with 0.2 ml. each of the serum-virus mixture and then incubated an additional 7 days at 36° C. The chorioallantoic membranes were then removed and examined for lesions. The SN titer was reported as the reciprocal of the greatest dilution of serum which failed to induce plaques on the chorioallantoic membrane.

Fourteen days after vaccination with my vaccine, all of the dogs, including the control dogs, were unchallenged with 1 ml. of virulent Snyder-Hill canine distemper virus as an intraveneous injection. The dogs were observed for approximately 4 weeks after the challenge to detect symptoms of canine distemper.

The table below reports the serum neutralizing antibody titers of the vaccinated and control dogs.

| Vaccine lot | Vaccine titer, $EID_{50}$/ml. | | Dog titer: Pre-inoculation | Dog titer: Post-inoculation |
|---|---|---|---|---|
| Lot 1, harvest 1 | $10^{4.50}$ | Dog 1 | <2 | 316 |
| | | Dog 2 | <2 | 316 |
| Lot 1, harvest 2 | $10^{4.70}$ | Dog 1 | <2 | 316 |
| | | Dog 2 | <2 | 316 |
| Lot 2, harvest 1 | $10^{3.20}$ | Dog 1 | <2 | 32 |
| | | Dog 2 | <2 | 32 |
| Lot 2, harvest 2 | $10^{3.80}$ | Dog 1 | <2 | 100 |
| | | Dog 2 | <2 | 32 |
| | | Control dogs | <2 | ---------- |
| | | | <2 | ---------- |
| | | | <2 | ---------- |
| | | | <2 | ---------- |

All of the control dogs died of canine distemper within 3 weeks after the challenge was administered. All of the vaccinated dogs remained in good health and did not exhibit signs of canine distemper after challenge.

The SN titer data in the table above show that all of the vaccinated dogs converted and produced immunizing amounts of serum neutralizing antibody within about 2 weeks after vaccination, even though only 1/10 of a normal dose was administered, and the vaccine was stored at a high temperature for a time before administration to the dogs. The results of the test prove that my vaccine confers solid immunity to canine distemper to vaccinated dogs, with complete safety and freedom from untoward side effects.

Vaccines are often administered to dogs in the form of mixtures of vaccines. For example, a mixture of a canine distemper vaccine with infectious canine hepatitis and leptospira vaccines is frequently used. The use of my new canine distemper virus vaccine in mixtures containing other canine vaccines, where each vaccine performs its expected function, is convenient and is within the contemplated scope of my invention.

I claim:

1. A method of producing a canine distemper virus vaccine which comprises the steps of
    (1) culturing LLC—MK$_2$ monkey kidney cells in a suitable growth medium containing from about 2 percent to about 5 percent of mammalian blood serum;
    (2) inoculating the LLC—MK$_2$ cells with an antigenic canine distemper virus which has previously been adapted by serial passage modification of virulent canine distemper virus in a sufficient number of primary dog kidney cell serial passages to adequately attenuate its virulence, followed by a sufficient number of serial passages in 7-day incubated fertile hen's eggs to thereby adapt the virus to growth in eggs so that it can be assayed by an egg-infective dose determination, and then adapting the attenuated virus to LLC—MK$_2$ monkey kidney cells by serial passages in an African green monkey kidney cell line, which virus then
        (a) immunizes a dog, which does not have and is not immune to canine distemper at the time of immunization, against canine distemper when a dog of at least about $10^2$ EID$_{50}$ of the improved virus is administered percutaneously to the dog;
        (b) does not cause signs of canine distemper in a dog to which the virus is administered;
        (c) replicates without producing cytopathogenic effect in LLC—MK$_2$ monkey kidney cell line culture in which it has been grown to produce a virus concentration of from about $10^3$ to about $10^5$ EID$_{50}$/ml. in from about 3 to about 4 days after inoculation of at least about $10^2$ EID$_{50}$ of the virus into the LLC—MK$_2$ monkey kidney cell line;
        (d) does not produce cytopathogenic effect upon cells of any other known mammalian continuous cell line in cell culture; and
        (e) produces assayable opaque plaques on the chorioallantoic membrane of an incubated fertile chicken egg within 7 days after the introduction of the virus into the egg in a concentration not less than about $10^{-5}$ of the maximum concentration of the canine distemper virus culture medium;
    (3) allowing the virus to grow at a temperature from about 33° to about 40° C. until the titer of the vaccine is from about $10^3$ to about $10^5$ EID$_{50}$ per ml.; and
    (4) harvesting the vaccine.

2. The method of Claim 1 in which the virus is the virus which is deposited as ATCC VR 685.

3. The method of Claim 2 in which the cells are cultured in a cell culture bottle.

4. The method of Claim 3 in which the growth medium is medium 199.

5. The method of Claim 4 in which the mammalian blood serum is fetal calf erum.

6. A canine distemper virus vaccine which comprises a diluent liquid and an antigenic canine distemper virus produced in accordance with the method of Claim 1 and which
    (1) immunizes a dog, which does not have and is not immune to canine distemper at the time of immunization, against canine distemper when a dose of at least about $10^2$ EID$_{50}$ of the virus is administered percutaneously to the dog;
    (2) does not cause symptoms of canine distemper in a dog to which the virus is administered;
    (3) replicates without producing cytopathogenic effect in LLC—MK$_2$ monkey kidney cell line culture in which it has been grown to produce a virus concentration of from about $10^3$ to about $10^5$ EID$_{50}$/ml. in from about 3 to about 4 days after inoculation of at least about $10^2$ EID$_{50}$ of the virus into the LLC—MK$_2$ monkey kidney cell line;
    (4) does not produce cytopathogenic effect upon cells of any other known mammalian continuous cell line in cell culture; and
    (5) produces assayable opaque plaques on the chorioallantoic membrane of an incubated fertile chicken egg within 7 days after the introduction of the virus into the egg in a concentration not less than about $10^{-5}$ of the maximum concentration of the canine distemper virus culture medium.

7. The vaccine of Claim 6 in which the virus is the virus which is deposited as ATCC VR 685.

8. The vaccine of Claim 7 in which the diluent liquid is the growth medium in which the virus was grown.

9. The vaccine of Claim 7 in which the diluent liquid comprises the growth medium in which the virus was grown and a bulking agent suitable for use in injectable vaccines.

10. A method of immunizing a dog against canine distemper which comprises percutaneously administering to the dog an immunizing amount of the vaccine of Claim 6.

11. The method of Claim 10 wherein the amount of vaccine administered to the dog supplies from about $10^3$ to about $10^6$ EID$_{50}$ of virus.

References Cited
UNITED STATES PATENTS

| | | | |
|---|---|---|---|
| 3,354,038 | 11/1967 | Bass | 424—89 X |
| 3,080,291 | 3/1963 | Sinha et al. | 424—89 |
| 3,616,203 | 10/1971 | Brown | 424—89 X |
| 3,098,011 | 7/1963 | Rockborn | 424—89 |
| 2,912,361 | 11/1959 | Froelich | 424—89 |

SHEP K. ROSE, Primary Examiner

U.S. Cl. X.R.
195—1.1, 1.3, 1.8

UNITED STATES PATENT OFFICE
CERTIFICATE OF CORRECTION

Patent No. 3,836,626         Dated September 17, 1974

Inventor(s) John F. Lavender

It is certified that error appears in the above-identified patent and that said Letters Patent are hereby corrected as shown below:

Column 1, line 31, the word "of" should be inserted after the word "culture", second occurrence.

Column 4, line 6, the word "tgg" should read --egg--.

Column 8, line 50, the word "unchallenged" should read --challenged--.

Column 9, line 43, the word "dog" should read --dose--.

Signed and sealed this 17th day of December 1974.

(SEAL)
Attest:

McCOY M. GIBSON JR.
Attesting Officer

C. MARSHALL DANN
Commissioner of Patents